United States Patent [19]

Casey et al.

[11] Patent Number: 5,511,986

[45] Date of Patent: *Apr. 30, 1996

[54] IC PACK CONNECTOR WITH DETECT SWITCH

[75] Inventors: Patrick G. Casey, Rathmore, Ireland; Tom Cruise, Batavia, Ill.; Matthew Wilhite, Dooradoyle, Ireland

[73] Assignee: Molex Incorporated, Lisle, Ill.

[ * ] Notice: The term of this patent shall not extend beyond the expiration date of Pat. No. 5,330,363.

[21] Appl. No.: 200,722

[22] Filed: Feb. 23, 1994

[51] Int. Cl.⁶ .................................................. H01R 29/00
[52] U.S. Cl. .................................................. 439/188; 439/157
[58] Field of Search ........................... 439/153, 157, 439/160, 188

[56] References Cited

U.S. PATENT DOCUMENTS

| | | | |
|---|---|---|---|
| 4,838,804 | 6/1989 | Banjo et al. | 439/325 |
| 4,887,188 | 12/1989 | Yoshida et al. | 361/413 |
| 4,900,272 | 2/1990 | Lange et al. | 439/630 |
| 4,900,273 | 2/1990 | Pernet | 439/630 |
| 4,955,817 | 9/1990 | Sugai | 439/60 |
| 5,013,255 | 5/1991 | Juret et al. | 439/260 |
| 5,033,972 | 7/1991 | Komatsu et al. | 439/153 |
| 5,191,970 | 3/1993 | Brockway et al. | 439/157 X |
| 5,259,777 | 11/1993 | Schuder et al. | 439/188 |
| 5,286,214 | 2/1994 | Takahashi | 439/159 |
| 5,317,482 | 5/1994 | Bujtas | 439/157 X |
| 5,330,363 | 7/1994 | Gardner et al. | 439/188 OR |

FOREIGN PATENT DOCUMENTS

WO9317471A1  9/1993  WIPO .................... H01R 13/648

OTHER PUBLICATIONS

AMP Drawing No. 92-5993-9 Sheet 1 of 2.
DuPont Drawing Sheet 1 of 2 Dated Aug. 28, 1992.

*Primary Examiner*—Larry I. Schwartz
*Assistant Examiner*—Daniel Wittels
*Attorney, Agent, or Firm*—Stacey E. Caldwell

[57] ABSTRACT

A connector provides an interconnection between an IC pack and a printed circuit board. The connector is in the form of a header for mounting on the printed circuit board and into which the IC pack is inserted. A plurality of terminals on the header are adapted for interconnection of the IC pack to electrical traces on the printed circuit board. An electrical switch is provided in the header and is actuated by the IC pack upon insertion of the IC pack therewithin and therefore detects the presence of the IC pack within the header. The switch is interconnected to electrical traces on the printed circuit board.

6 Claims, 4 Drawing Sheets

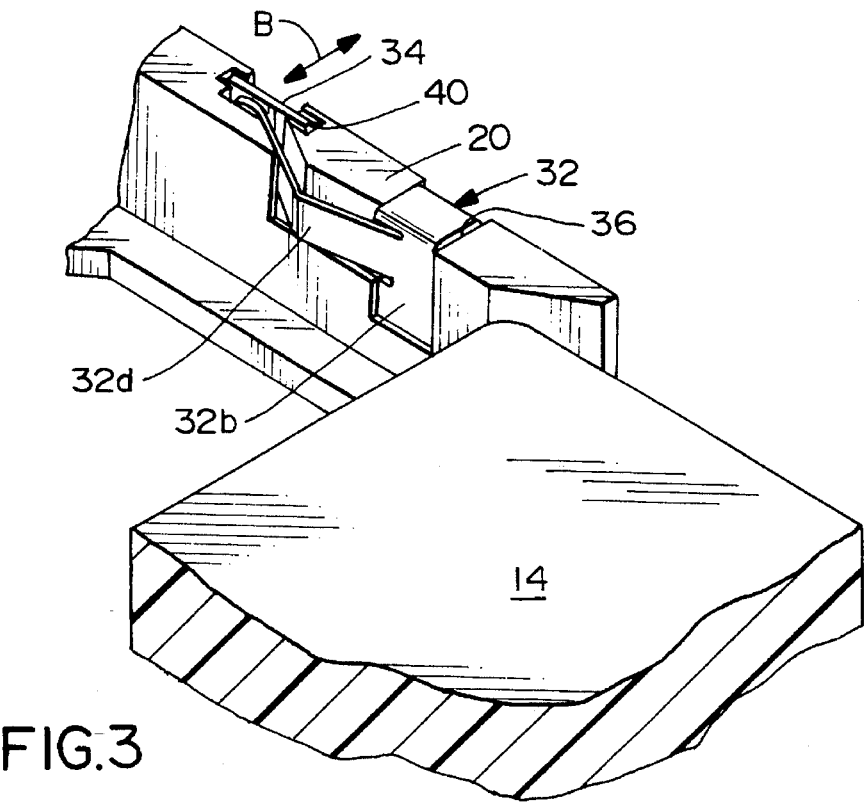
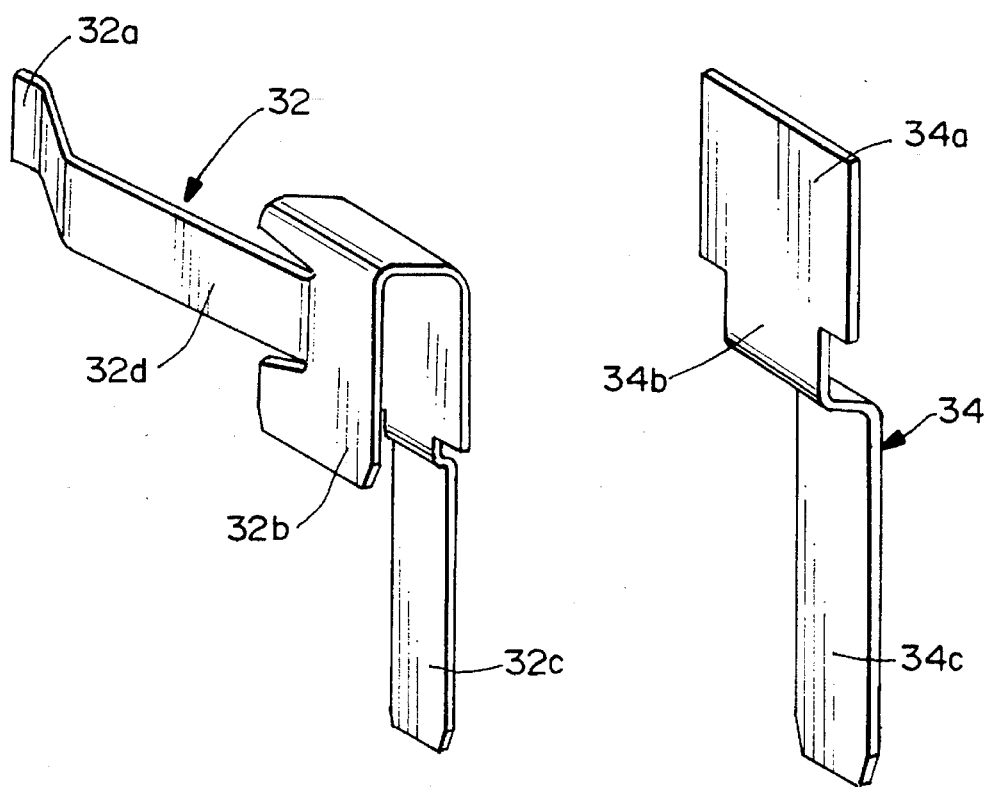
FIG.3
FIG.4A
FIG.4B

IC PACK CONNECTOR WITH DETECT SWITCH

FIELD OF THE INVENTION

This invention generally relates to the art of electrical connectors and, particularly, to a connector which provides an interconnection between an IC pack and a printed circuit board and, further, to such a connector which includes a switch actuatable in direct response to movement of an IC pack therewithin.

BACKGROUND OF THE INVENTION

A conventional connector for an IC pack or memory card includes a generally U-shaped connector assembly having guide grooves inside a pair of side portions, with a connecting section joining or extending between the side portions. A planar IC pack is inserted into the connector between the side portions. A transverse array of socket terminals at an edge of the IC pack electrically interconnect with an associated array of pin terminals on the connecting section.

Such connectors often are provided as headers used for interconnecting the semi-conductor circuit of the IC pack to an external circuit such as a main electronic unit. The header may be used with an IC pack or memory card for removably coupling the IC pack to a printed circuit board. The IC pack is inserted into the header and is extracted therefrom as needed.

One of the problems with IC pack connectors of the character described above, particularly in headers employed with printed circuit boards, is that the insertion or extraction of the IC packs with respect to the connectors can interfere with ongoing processes or interrupt data transfer, for example, between the IC pack and the main electronic unit. Furthermore, a program or a user may not be alerted to the fact that an IC pack or memory card is not present which is needed for certain processes.

Switches have been designed into connectors for the purpose of detecting the presence of an IC pack or memory card. Several such designs have been incorporated into card readers, such as are disclosed in U.S. Pat. Nos. 4,900,272, 4,900,273 and 5,013,255. These designs use an "end of stroke" contact to detect the position and/or full insertion of the card within the connector. However, such designs are not easily adaptable to pin and socket type memory card interfaces such as is defined by the Personal Computer Memory Card International Association ("PCMCIA") standards. In the card reader connectors of the prior art, the "end-of-stroke" contact is positioned at the rear of the card slot. This is practical in such connectors because it does not interfere with the mating contact interface, since the card reader contacts are typically mounted in the base of the connector housing and the forces are exerted on the card perpendicular to the direction of insertion. However, in pin and socket type cards, where the mating contact interface is at the rear of the card slot, and the forces exerted between the mating contacts are opposite the direction of insertion, this type of "end-of-stroke" contact is impractical. First, the "end-of-stroke" contact at the rear of the card slot would interfere with and/or obstructed by the mating contact interface, and, second the forces exerted by the "end-of-stroke" contact would increase the insertion forces of the card itself, opposing the frictional force of the contacts. Accordingly, such a structure is not useful for the PCMCIA applications.

Another design for detecting the insertion and/or extraction of an IC pack or memory card within a card slot is disclosed in U.S. Pat. No. 5,330,363 and assigned to the assignee of this invention. However, the switch design as disclosed is for use only with a card ejecting mechanism wherein the movement of the actuator or push rod closes the switch in response to the movement of the card.

Applicants' invention is directed to a connector having a switch wherein the switch is actuated in direct response to the insertion of an IC pack into the connector. Therefore, the switch can be used to shut down various processing upon insertion of the IC pack into the connector and to otherwise detect the presence of an IC pack and alert a user of the same. The switch is incorporated in the path of insertion of the IC pack so that modifications to standard IC packs and the interfacing of the packs with the connector do not have to be made.

SUMMARY OF THE INVENTION

An object, therefore, of the invention is to provide a new and improved connector for providing an interconnection between an IC pack or memory card and an electronic unit, such as a printed circuit board, and including a switch in the connector.

In the exemplary embodiment of the invention, the connector is illustrated for interconnection between an IC pack and a printed circuit board. The connector is specifically a header connector for mounting on the printed circuit board and into which the IC pack is inserted and from which it is ejected. A plurality of pin terminals are mounted in the header connector and are adapted for interconnection of the IC pack to electrical traces on the printed circuit board. The invention contemplates that an electrical switch be provided on the header connector in such a manner that the switch is actuated in direct response to insertion of the IC pack. The switch is interconnected to electrical traces on the printed circuit board.

In the preferred embodiment of the invention, the electrical switch is provided by way of a pair of normally spaced-apart contacts, whereby the contacts are closed in response to insertion of the IC pack into the header connector. As disclosed herein, the electrical switch is positioned so as to have one of its contacts movably mounted in the path of insertion of the IC pack or memory card for actuation thereby as the IC pack is moved into electrical engagement with the header.

Other objects, features and advantages of the invention will be apparent from the following detailed description taken in connection with the accompanying drawings.

BRIEF DESCRIPTION DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a further enlarged perspective view of the switch on the connector;

FIG. 4A and 4B are perspective views of the contacts of the switch removed from the connector;

DETAILED DESCRIPTION OF THE PREFERRED EMBODIMENT

Figure 1:
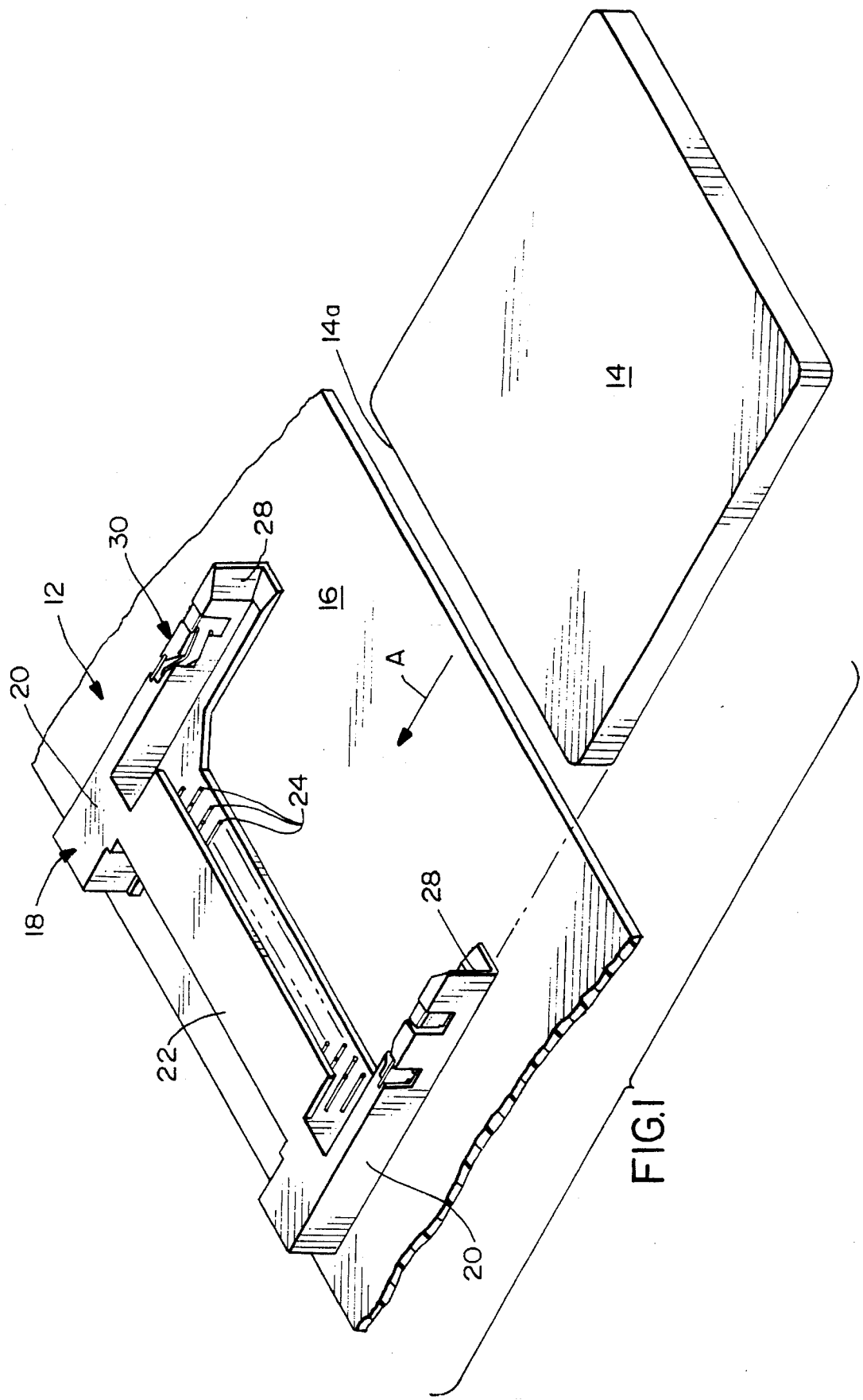
FIG. 1 is a perspective view of the connector of the invention mounted to a printed circuit board, and an IC pack for insertion into the connector.

Referring to the drawings in greater detail, and first to FIG. 1, the invention is embodied in a connector in the form of a header, generally designated 12, for providing an interconnection between an IC pack 14 and a printed circuit board 16. The header is adapted for receiving the IC pack in the direction of arrow "A".

Figure 2:
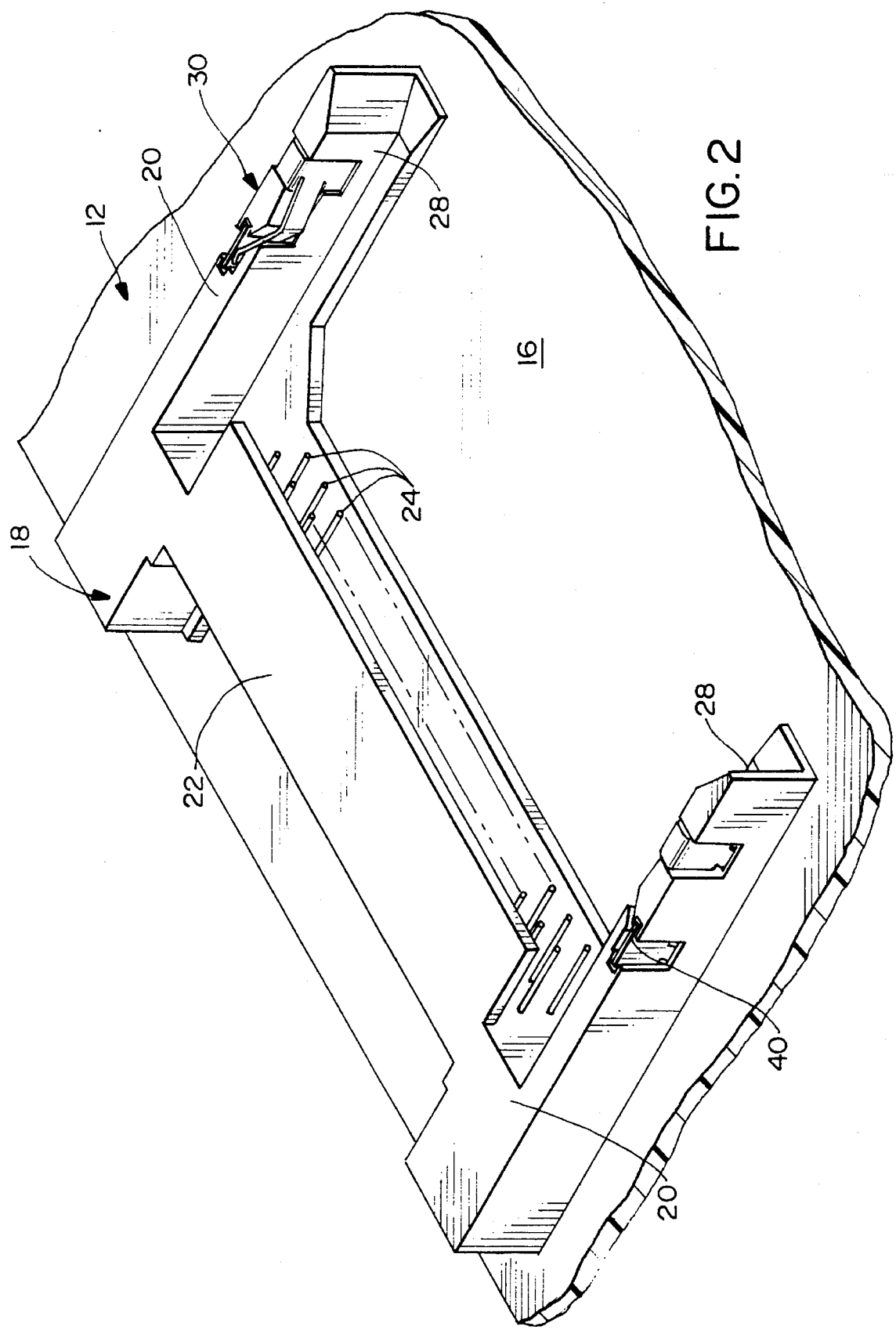
FIG. 2 is an enlarged perspective view of the connector mounted to the printed circuit board.

Referring to FIG. 2 in conjunction with FIG. 1, header 12 is of a generally known configuration and includes a dielectric housing 18 defined by a pair of side portions 20 joined by a connecting section 22. The connecting section 22 mounts a plurality of terminals having pin portions 24 projecting generally parallel to the plane of the printed circuit board toward the IC pack. The terminals include tail portions (not shown) connected to circuit traces on the upper surface of printed circuit board 16, as by soldering. Side portions 20 include guide grooves 28 on the inside thereof for defining an IC pack pathway and for guiding IC pack 14 into the header, whereby socket terminals (not shown) in forward edge 14a of the IC pack interengage with pin portions 24 of the terminals of the header. Lastly, an electrical switch 30 is provided on the header at the inside of the side portions 20, along the guide grooves 28 and in the path of insertion of the IC pack, for purposes to be described hereinafter. Suffice it to say at this point, the electrical switch is actuated in response to the insertion of IC pack 14 into the header 12.

In assembly, header 12 is mounted to printed circuit board 16 with the terminals of the header interconnected to circuit traces on the printed circuit board via soldering an IC pack or memory card, such as IC pack 14, can then be inserted into and extracted from header 12 as needed.

Figure 5:
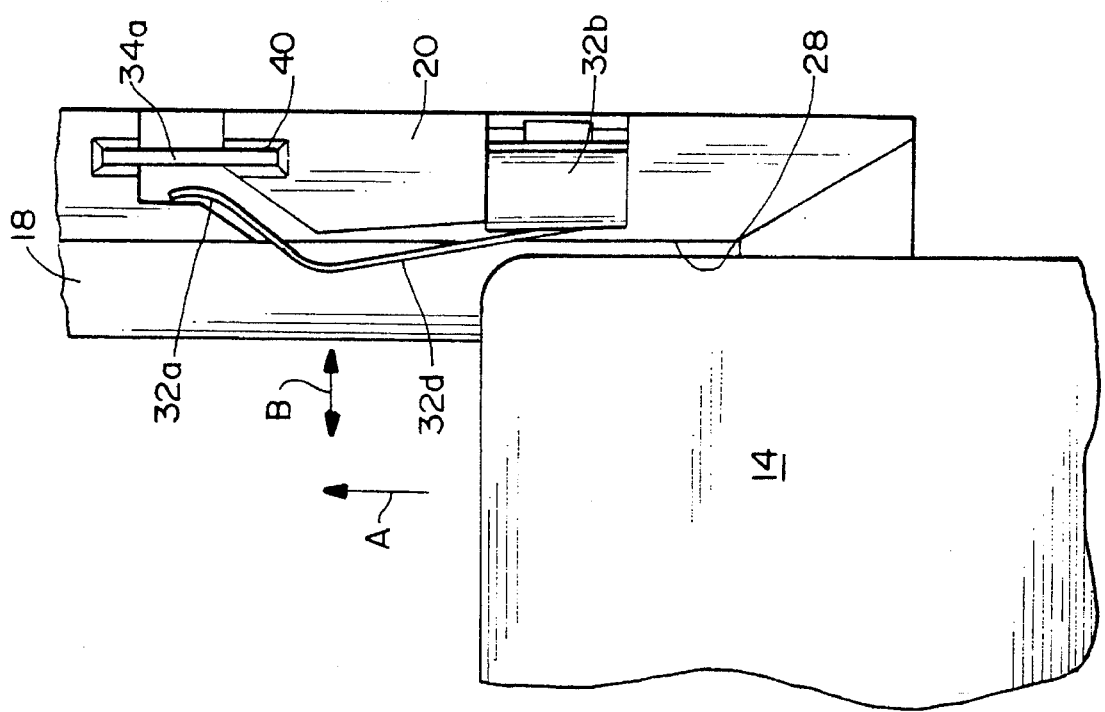
FIG. 5 is a top plan view of the switch in its open condition, prior to insertion of the IC pack.

Referring to FIGS. 3 and 4 in conjunction with FIGS. 1 and 2, electrical switch 30 is embodied in a pair of electrical contacts, generally designated 32 and 34. The contacts are stamped and formed of sheet metal material and are mounted in dielectric housing 18 of header 12 such that contact portions 32a and 34a of contacts 32 and 34, respectively, are normally spaced-apart (FIG. 5). More particularly, contact 32 includes a generally U-shaped anchoring portion 32b (FIG. 4) for retention within a corresponding groove 36 within the header housing 18 (FIG. 3) to hold contact 32 securely within the header. Contact 32 further includes a foot portion 32c for soldering within a plated through hole or surface mounting to a circuit trace on printed circuit board 16. Contact portion 32a is joined to anchoring portion 32b by a spring arm 32d so that the contact portion is movable in the direction of double-headed arrow "B", but the contact portion is biased toward its normally open position shown in FIGS. 3 and 5.

Contact 34 similarly includes an anchoring portion 34b for being retained within a groove 40 of the housing. Contact 34 also includes a foot portion 34c for soldering within a plated through hole or surface mounting to a circuit trace on printed circuit board 16. Contact portion 34a is cantilevered upwardly from anchoring portion 34b and is spaced away from contact portion 32a of contact 32 in the normally open condition of the switch (FIG. 5). Therefore, contact portion 34a of contact 34 may be considered the fixed contact of switch 30 and contact portion 32a of contact 32 may be considered the movable contact of the switch.

Figure 6:
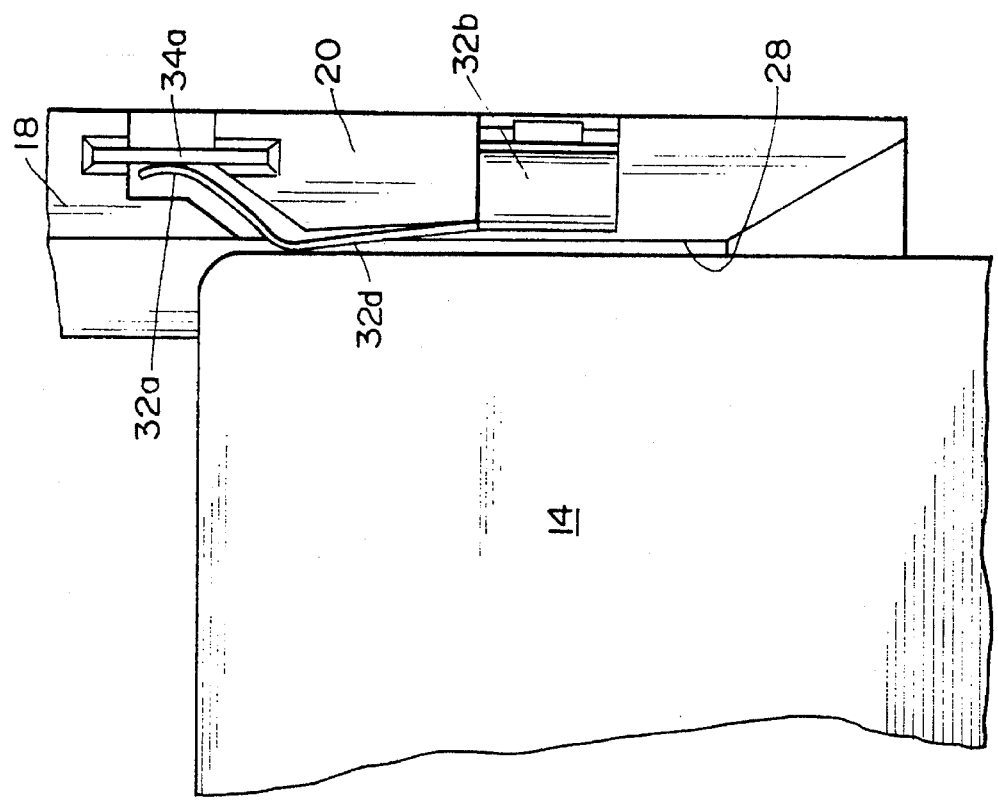
FIG. 6 is a view similar to that of FIG. 5, with the IC pack inserted and moved to a position of closing the switch.

Referring now to FIGS. 5 and 6, the location of switch 30 in relation to the IC pack 14 is illustrated. It can be seen in FIGS. 5 and 6 that movable contact portion 32a of contact 32 of electrical switch 30 is located in the path of insertion of IC pack 14. Movable contact portion 32a projects inwardly within the IC pack pathway defined by guide grooves 28 a sufficient distance to cause movable contact portion 32a to engage contact portion 34a of contact 34 for each insertion of IC pack 14. That is to say, movable contact portion 32a moves in a direction perpendicular to the insertion of the IC pack. Since only a portion of the force exerted against the movable contact is directly opposing the insertion force of the card, the switch can be incorporated within one or both of the guide grooves 28 without substantially effecting the insertion force of the IC pack. Contact portion 52a is sufficiently resilient to prevent any damage to the switch construction. In essence, it can be understood that the above-described construction of electrical switch 30, along with its location and that of actuation by the IC pack itself, forms a switch which is actuated by the presence of the IC pack, i.e. detects the insertion and presence of an IC pack within the IC pack pathway. Furthermore, the switch 30 may be positioned anywhere within guide grooves 28 along side portion 20 to detect the presence of an IC pack at any point of travel along the IC pack pathway. For example, the switch could be positioned along groove 28 proximate the header pins 24, thus alerting a user that the IC card is not only positioned within the IC pack pathway, but electrically engaging the header pins.

Therefore, in operation, when an IC pack is inserted into header 12, the movement of the IC pack causes the movable contact 32a to move from the position shown in FIG. 5 to the position shown in FIG. 6 whereat the electrical switch is actuated (i.e. connecting the electrical circuit through the circuit traces on the printed circuit board interconnected to feet 32c and 34c of the contacts).

Electrical switch 30 can be used for a variety of purposes, including a detection of the presence or absence of the IC pack during a desired operation to prevent interference with ongoing processes or data transfer which might be affected by the removal or insertion of the IC pack, or the warning or notice that an IC pack is required to be inserted to perform a requisite or desired function. Therefore, electrical switch 30 is located in the path of IC pack 14 so that the system may be shut-down or "notified" of the disengagement of terminals pins 24 from the terminal sockets of the IC pack, or, upon insertion of an IC pack, to open the switch and allow the system to operate and/or transfer data when the terminals have been fully interengaged.

Note that depending on the location of the switch, the detection can be performed at any stage of the insertion of the IC pack. In addition, by having the switch actuated by the IC pack itself, the header can be used either with or without an ejector mechanism. Such a design allows for flexibility depending on the specific application.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a connector for providing an interconnection between an IC pack and a printed circuit board, including
    a header connector for mounting on the printed circuit board including guide grooves defining a pathway into which the IC pack is inserted, and
    a plurality of terminals on the header connector located at the rear of the pathway and adapted for interconnection of the IC pack to electrical traces on the printed circuit board,
    wherein the improvement comprises:
        an electrical switch positioned within the guide grooves of the header connector and adapted to be electrically interconnected to electrical traces on the printed circuit board, wherein the switch is adapted to be directly actuated by the IC pack in direct response to insertion thereof.

2. In a connector as set forth in claim 1, wherein said electrical swatch comprises a pair of spaced-apart contacts one of which is positioned in the pathway of the IC pack, whereby the contacts are closed by the IC pack in direct response to insertion of the IC pack into the pathway of the header connector.

3. In a connector as set forth in claim 1, wherein the electrical switch includes a movable contact portion located in the pathway of the IC pack for direct actuation by the IC pack itself upon insertion thereof into the pathway of the header connector.

4. In a connector as set forth in claim 3, wherein said movable contact portion of the electrical switch comprises one of a pair of normally spaced-apart contacts which is directly actuated by the IC pack and which is movable in a direction perpendicular to the direction of insertion of the IC pack.

5. A connector for providing an interconnection between an IC pack and a printed circuit board, comprising:
    a header connector for mounting on the printed circuit board including a connecting portion and two side portions having guide grooves defining a pathway into which the IC pack is inserted for mating connection with the connecting portion;
    a plurality of terminals mounted on the connecting portion adapted for interconnection of the IC pack to electrical traces on the printed circuit board; and
    an electrical switch within one of the guide grooves on one of the two side portions of the header connector including a movable contact portion located in the pathway of the IC pack for direct actuation by the IC pack itself upon insertion on thereof into the guide grooves of the header connector.

6. The connector of claim 5 wherein said movable contact portion of the electrical switch comprises one of a pair of normally spaced-apart contacts which is actuated by the IC pack and moves in a direction perpendicular to the direction of insertion of the IC pack.

* * * * *